(12) United States Patent
Zielke et al.

(10) Patent No.: US 10,658,637 B2
(45) Date of Patent: May 19, 2020

(54) APPARATUS FOR INCREASING SAFETY WHEN USING BATTERY SYSTEMS

(71) Applicant: Robert Bosch GmbH, Stuttgart (DE)

(72) Inventors: Christian Zielke, Eningen Unter Achalm (DE); Michael Riefler, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 534 days.

(21) Appl. No.: 15/117,202

(22) PCT Filed: Dec. 30, 2014

(86) PCT No.: PCT/EP2014/079421
§ 371 (c)(1),
(2) Date: Aug. 7, 2016

(87) PCT Pub. No.: WO2015/117716
PCT Pub. Date: Aug. 13, 2015

(65) Prior Publication Data
US 2016/0351870 A1 Dec. 1, 2016

(30) Foreign Application Priority Data
Feb. 10, 2014 (DE) .................. 10 2014 202 329

(51) Int. Cl.
*H01M 2/12* (2006.01)
*H01M 2/18* (2006.01)
*H01M 10/0525* (2010.01)

(52) U.S. Cl.
CPC .......... *H01M 2/1223* (2013.01); *H01M 2/12* (2013.01); *H01M 2/1241* (2013.01); *H01M 2/18* (2013.01);
(Continued)

(58) Field of Classification Search
None
See application file for complete search history.

(56) References Cited

U.S. PATENT DOCUMENTS

| 2006/0024574 | A1 | 2/2006 | Yim et al. | |
|---|---|---|---|---|
| 2011/0020676 | A1* | 1/2011 | Kurosawa | B60K 1/04 429/62 |
| 2013/0316208 | A1* | 11/2013 | Yoshiura | H01M 2/22 429/94 |

FOREIGN PATENT DOCUMENTS

| CN | 100409464 C | 8/2008 |
|---|---|---|
| CN | 103474599 A | 12/2013 |

(Continued)

OTHER PUBLICATIONS

Machine-assisted English translation for CN 203589111. (Year: 2014).*

(Continued)

*Primary Examiner* — Sin J Lee
(74) *Attorney, Agent, or Firm* — Maginot, Moore & Beck LLP

(57) ABSTRACT

A battery system includes at least one battery apparatus having at least one apparatus for increasing safety when using a degassing apparatus. The degassing apparatus is suitable for the controlled degassing of battery apparatuses. The battery apparatus and the apparatus are surrounded by a housing. The degassing apparatus is inserted into a wall of a housing. The apparatus generates a physical distance between the battery apparatus and the degassing apparatus such that a space is kept free between the battery apparatus and the degassing apparatus for discharging substances, which emerge from the battery apparatus, to an area surrounding the battery system.

17 Claims, 3 Drawing Sheets

(52) U.S. Cl.
CPC .... *H01M 10/0525* (2013.01); *H01M 2220/20* (2013.01); *Y02B 10/30* (2013.01)

(56) References Cited

FOREIGN PATENT DOCUMENTS

| | | |
|---|---|---|
| CN | 203589111 U | 5/2014 |
| DE | 10 2012 200 869 A1 | 7/2013 |
| DE | 10 2012 213 697 A1 | 2/2014 |
| EP | 1 821 355 A2 | 8/2007 |
| EP | 2 262 048 A1 | 12/2010 |
| EP | 2 557 615 A1 | 2/2013 |
| WO | 2011/095369 A1 | 8/2011 |
| WO | 2012/178205 A2 | 12/2012 |
| WO | 2013/011915 A1 | 1/2013 |
| WO | 2013/072468 A2 | 5/2013 |

OTHER PUBLICATIONS

International Search Report corresponding to PCT Application No. PCT/EP2014/079421, dated Feb. 17, 2015 (German and English language document) (7 pages).

\* cited by examiner

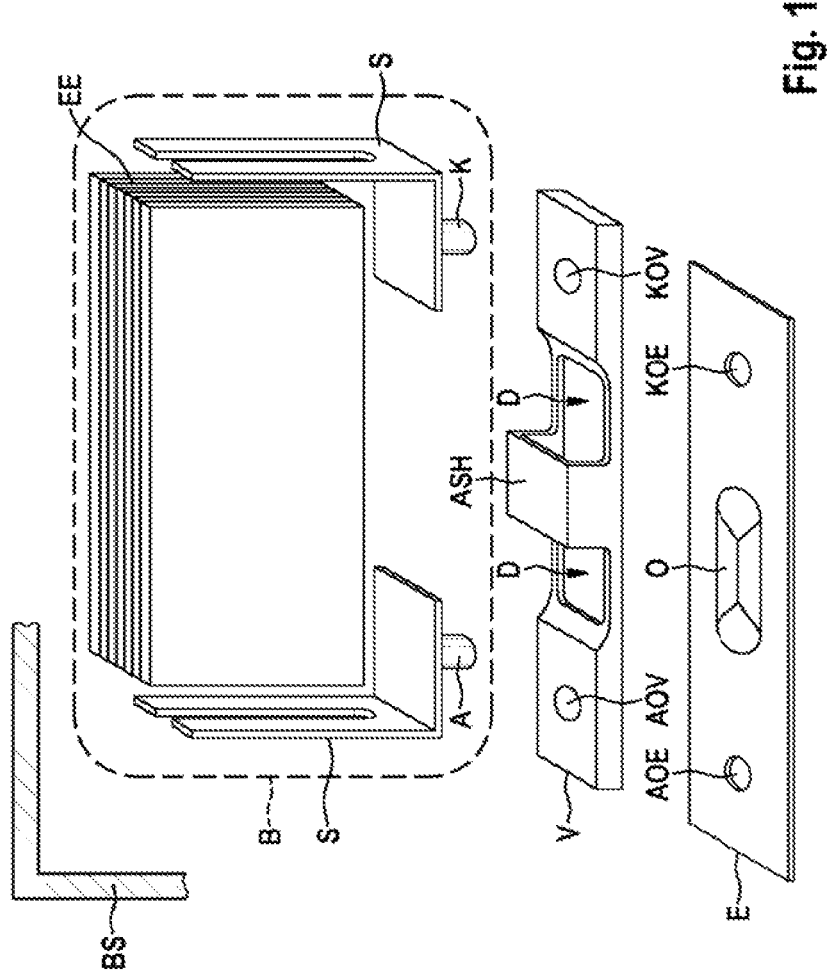

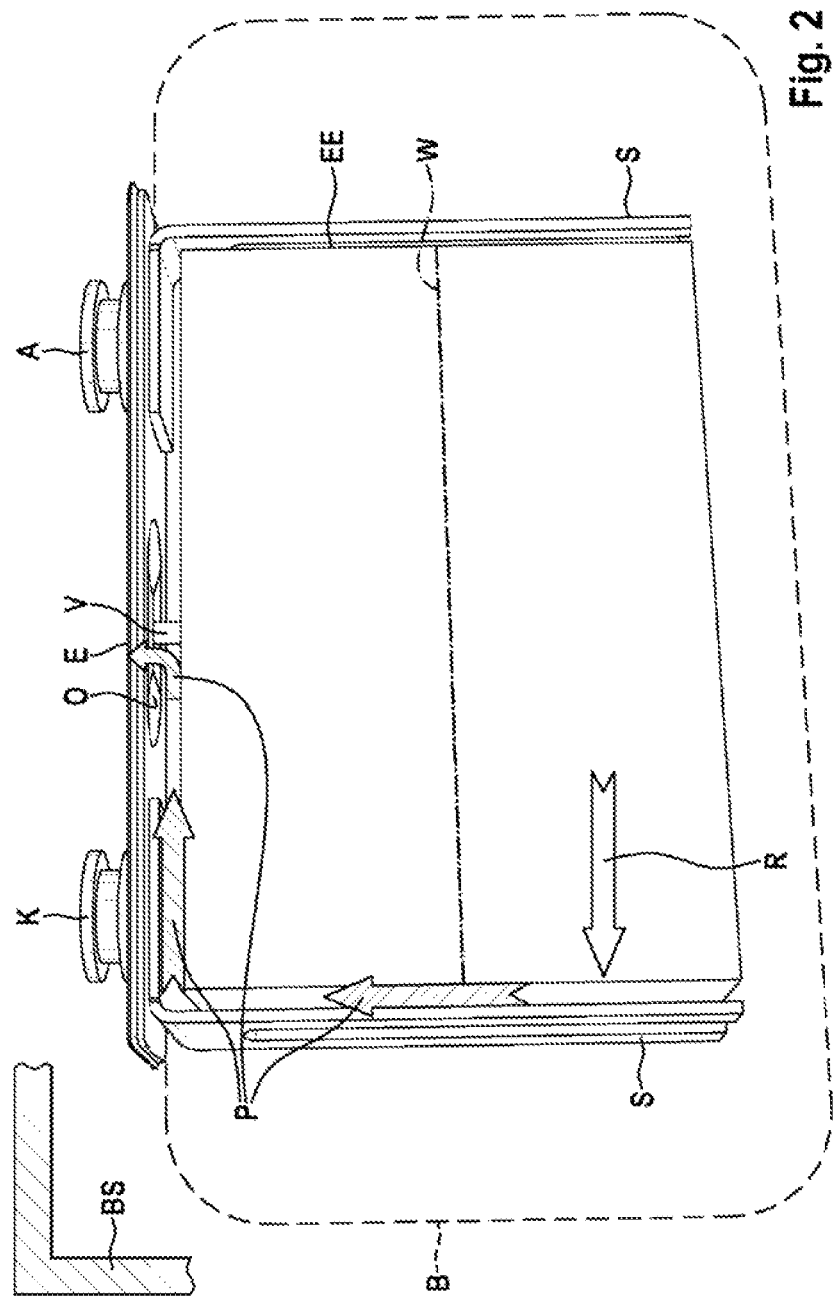

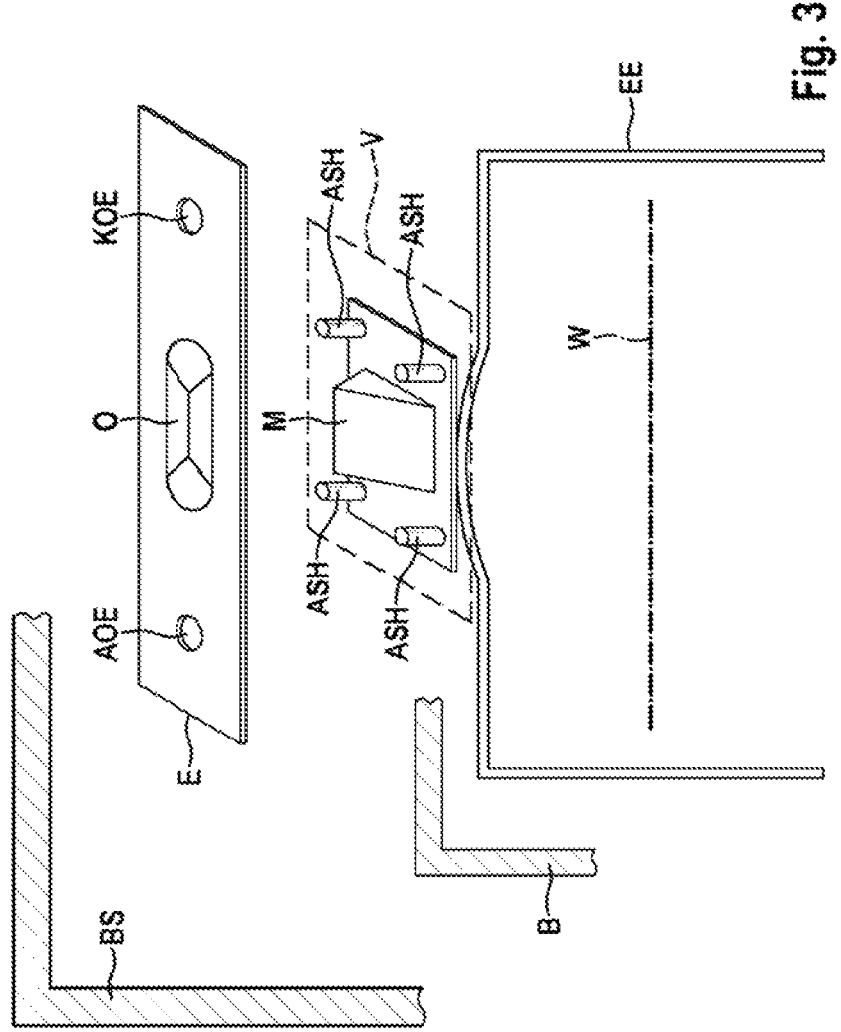

APPARATUS FOR INCREASING SAFETY WHEN USING BATTERY SYSTEMS

This application is a 35 U.S.C. § 371 National Stage Application of PCT/EP2014/079421, filed on Dec. 30, 2014, which claims the benefit of priority to Serial Number DE 10 2014 202 329.7, filed on Feb. 10, 2014 in Germany, the disclosures of which are incorporated herein by reference in their entireties.

BACKGROUND

The present disclosure relates to a battery system and also the use of said battery system in accordance with the following description.

Battery systems are known from the prior art, wherein the battery systems comprise a degassing apparatus, wherein the degassing apparatus is suitable for dissipating substances that escape from battery systems.

SUMMARY

The disclosure is based on a battery system, in particular a lithium ion battery system including at least one battery apparatus having at least one apparatus for increasing safety when using a degassing apparatus, wherein the degassing apparatus is suitable for degassing battery apparatuses in a controlled manner, and wherein the battery apparatus and the apparatus are surrounded by a housing and the degassing apparatus is inserted into a wall of the housing. The battery apparatus can be a battery module or a battery cell or an electrochemical energy storage device.

The disclosure relates to a battery system, wherein the battery system comprises an apparatus for increasing safety when using a degassing apparatus, and wherein the degassing apparatus is suitable for degassing battery apparatuses in a controlled manner, and wherein the battery apparatus and the apparatus are surrounded by a housing, and the disclosure also relates to the use of said battery apparatus having the characterizing features described in the following description.

The core of the disclosure resides in the fact that the apparatus produces a gap between the battery apparatus and the degassing apparatus in such a manner that a space is kept free between the battery apparatus and the degassing apparatus so as to dissipate substances which escape from the battery apparatus into an area surrounding the battery system.

The fact that the apparatus produces a gap between the battery apparatus and the degassing apparatus in such a manner that a space is kept free between the battery apparatus and the degassing apparatus so as to dissipate substances which escape from the battery apparatus into an area surrounding the battery system leads to the advantage in accordance with the disclosure of being able to dissipate in an unhindered manner and as rapidly as possible substances that have escaped from the battery apparatus. The probability of injury to people or damage to objects that are located in the vicinity of a battery system is reduced by means of dissipating in an unhindered manner and as rapidly as possible substances that escape from the battery apparatus.

The background of the disclosure is that degassing apparatuses in which the substances are hindered when dissipating and therefore are dissipated into the area surrounding the battery system at a delayed rate comprise a higher probability of damage than degassing apparatuses of the type in which the substances are dissipated into the area surrounding the battery system in an unhindered manner and therefore more rapidly. To a large extent, by means of keeping a space between the battery apparatus and the degassing apparatus free, it is rendered possible for substances that escape the battery apparatus to dissipate in an unhindered manner. Battery systems in which the substances are dissipated slower than intended as a result of an impediment can be damaged as a result of the effects of the substances and pose a risk to people or objects in the area surrounding such a battery system. In particular, it is possible for the battery system to burst due to a pressure that is generated as a result of the effects of the substances.

In addition, the disclosure relates to the use of a battery system in a vehicle, in particular in a motor vehicle. In addition, the use of the battery system in shipping, air travel and space travel or in energy storage devices, in wind power stations, in solar power stations or in emergency power generators is also feasible.

Further advantageous embodiments of the present disclosure are the subject matter of the following description.

According to an advantageous embodiment of the disclosure, the gap is of 0.001 m to 0.1 m, in particular of 0.005 m to 0.015 m.

According to a further preferred embodiment of the disclosure, the degassing apparatus is a bursting disk or a bursting membrane or a bursting valve or an excess pressure valve. The degassing apparatus is suitable for opening by means of the effect of a force or exerting a pressure and also for dissipating substances from the battery apparatus into the area surrounding the battery system.

According to a further preferred embodiment of the disclosure, the at least one apparatus is suitable for increasing safety when using a degassing apparatus so as to generate a force effect in dependence upon a state of the battery apparatus, in particular a physical change of the battery apparatus and/or a pressure that prevails within the interior of the battery apparatus. The effect of the force causes the degassing apparatus to open. An exemplary pressure is 2 bar to 10 bar.

The fact that the at least one apparatus for increasing safety when using a degassing apparatus is suitable for generating a force effect in dependence upon a state of the battery apparatus, in particular a physical change of the battery apparatus and/or a pressure that prevails within the interior of the battery apparatus, leads to the advantage in accordance with the disclosure that the at least one apparatus for increasing the safety when using a degassing apparatus can act upon the degassing apparatus when required.

The fact that the effect of a force causes the degassing apparatus to open leads moreover to the advantage in accordance with the disclosure of being able to dissipate from the battery system in a timely manner substances that have escaped from the battery apparatus and pose a risk. The probability of injury to people or damage to objects that are located in the area surrounding the battery system is reduced by means of dissipating these substances in a timely manner.

In accordance with a further advantageous embodiment of the disclosure, the at least one apparatus is suitable for increasing safety when using a degassing apparatus so as to exert a pressure on the degassing apparatus in dependence upon a state of the battery apparatus, in particular a physical change of the battery apparatus and/or a pressure that prevails within the interior of the battery apparatus. The pressure that is exerted on the degassing aperture is suitable for opening the degassing apparatus. A physical change of the battery apparatus is in particular a plastic deformation that is caused by way of example by means of an accident.

A plastic deformation of the battery apparatus is accompanied by the probability of damage to the battery apparatus, and the probability of damage to the battery apparatus is accompanied by the increased probability of injury to people or damage to objects that are located in the area surrounding the battery system.

According to a further preferred embodiment of the disclosure, the at least one apparatus for increasing safety when using a degassing apparatus is open for substances that escape from the battery apparatus. The substances that escape from the battery apparatus are in particular gases.

According to a further preferred embodiment of the disclosure, the at least one apparatus for increasing safety when using a degassing apparatus is electrically insulated. The fact that the at least one apparatus for increasing safety when using a degassing apparatus is electrically insulated leads to a reduced probability of an electrical short circuit occurring in the battery system.

BRIEF DESCRIPTION OF THE DRAWINGS

The disclosure is explained hereinbelow with reference to exemplary embodiments from which it possible to draw further features and the disclosure is not limited to said features in its scope. The exemplary embodiments are illustrated in the figures.

In the figures:

FIG. 1 illustrates schematically a battery system in accordance with the disclosure including at least one battery apparatus and at least one apparatus for increasing safety when using a degassing apparatus in accordance with a first embodiment, FIG. 2 illustrates schematically a battery system in accordance with the disclosure including at least one battery apparatus and at least one apparatus for increasing safety when using a degassing apparatus in accordance with a second embodiment, FIG. 3 illustrates schematically a battery system in accordance with the disclosure including at least one battery apparatus and at least one apparatus for increasing safety when using the degassing apparatus in accordance with a third embodiment.

DETAILED DESCRIPTION

FIG. 1 illustrates schematically a battery system in accordance with the disclosure including at least one battery apparatus having at least one apparatus for increasing safety when using a degassing apparatus in accordance with a first embodiment. BS refers to the battery system, in particular a lithium ion battery system. B refers to the battery apparatus, V refers to an apparatus for increasing safety when using a degassing apparatus and E refers to the degassing apparatus, wherein the degassing apparatus E is suitable for degassing the battery apparatus B in a controlled manner. O refers to an opening apparatus of the degassing apparatus E, said opening apparatus being suitable for opening under the effect of pressure and for dissipating substances that escape from the battery apparatus B.

The apparatus V is suitable for producing a gap between the battery apparatus B and the degassing apparatus E in such a manner that a space is reliably kept free between the battery apparatus B and the degassing apparatus E so as to dissipate substances that escape from the battery apparatus B in an area surrounding the battery system BS even in the case of a physical change of the battery apparatus B. The gap between the battery apparatus B and the degassing apparatus E is produced by means of a spacer that is referred to as ASH. The spacer ASH is embodied by way of example from synthetic material or metal. The apparatus V can comprise in particular two or more spacers ASH. D refers to apertures in the apparatus V, the apertures D are suitable for the substances to flow through, said substances escaping from the battery apparatus B.

The apparatus V can be embodied in particular from a synthetic material insulator.

EE refers to an electrode element. The electrode element EE represents a component of the battery apparatus B and comprises two electrodes and a separator that is arranged between the electrodes.

The apparatus V is in particular suitable for producing a gap between the electrode element EE and the degassing apparatus E.

S refers to a current collector, the current collector S is suitable for collecting electrical current from the battery apparatus B, in particular from the electrode element EE.

A refers to an anode and K refers to a cathode of the battery apparatus B.

AOV refers to an aperture in the apparatus V that is suitable for inserting the anode A.

KOV refers to an aperture in the apparatus V that is suitable for inserting the cathode K.

AOE refers to an aperture in the degassing apparatus E that is suitable for inserting the anode A.

KOE refers to an aperture in the degassing apparatus E that is suitable for inserting the cathode K.

The battery system B in accordance with the disclosure in accordance with the first embodiment is suitable by way of example for use in a vehicle, in particular in a motor vehicle. In addition, the use of the battery system B in shipping, air travel and space travel or in energy storage devices, in wind power stations, in solar power stations or in emergency power generators is also feasible.

FIG. 2 illustrates schematically a battery system in accordance with the disclosure including at least one battery apparatus having at least one apparatus for increasing safety when using a degassing apparatus in accordance with a second embodiment. BS refers to the battery system, in particular a lithium ion battery system. B refers to the battery apparatus, V refers to an apparatus for increasing safety when using a degassing apparatus and E refers to the degassing apparatus, wherein the degassing apparatus E is suitable for degassing the battery apparatus B in a controlled manner. A refers to an anode and K refers to a cathode of the battery apparatus B.

The apparatus V is suitable for producing a gap between the battery apparatus B and the degassing apparatus E in such a manner that a space is kept free between the battery apparatus B and the degassing apparatus E so as to dissipate substances that escape from the battery apparatus B in an area surrounding the battery system BS. The apparatus V can be embodied in particular from a synthetic material insulator.

EE refers to an electrode element. The electrode element represents a component of the battery apparatus and comprises two electrodes and a separator that is arranged between the electrodes.

The apparatus V is in particular suitable for producing a gap between the electrode element EE and the degassing apparatus E.

S refers to a current collector, the current collector S is suitable for collecting electrical current from the battery apparatus B, in particular from the electrode element EE.

W refers to a winding axis of the electrode element EE. Substances that are to be dissipated from the electrode element EE can leave the electrode element EE in a direction R parallel to the winding axis W. After the substances have left the electrode element EE, said substances flow along a flow path that is referred to as P. Since an increase in the volume of the electrode element EE is possible as a result of damage to the battery apparatus B, this can lead to a thermal expansion of the electrode element EE in the direction of the degassing apparatus E. To a large extent, the apparatus V ensures as a spacer the possibility of dissipating the substances in an unhindered manner.

The battery system B in accordance with the disclosure in accordance with the second embodiment is suitable for use by way of example in a vehicle, in particular in a motor vehicle. In addition, the use of the battery system B in shipping, air travel and space travel or in energy storage devices, in wind power stations, in solar power stations or in emergency power generators is also feasible.

FIG. 3 illustrates schematically a battery system in accordance with the disclosure including at least one battery apparatus having at least one apparatus for increasing safety when using a degassing apparatus in accordance with a third embodiment. BS refers to the battery system, in particular a lithium ion battery system. B refers to the battery apparatus, V refers to an apparatus for increasing safety when using a degassing apparatus and E refers to the degassing apparatus, wherein the degassing apparatus E is suitable for degassing the battery apparatus B in a controlled manner. O refers to an opening apparatus of the degassing apparatus E, said opening apparatus being suitable for opening under the effect of pressure and for dissipating substances that escape from the battery apparatus B. AOE refers to an aperture in the degassing apparatus E that is suitable for inserting an anode (not illustrated) of the battery apparatus B.

KOE refers to an aperture in the degassing apparatus E that is suitable for inserting a cathode (not illustrated) of the battery system.

The apparatus V is suitable for producing a gap between the battery apparatus B and the degassing apparatus E in such a manner that a space is kept free between the battery apparatus B and the degassing apparatus E so as to dissipate substances that escape from the battery apparatus B in an area surrounding the battery system BS. The apparatus V can in particular be embodied from a synthetic material insulator.

M refers to a mechanical bursting element opener, wherein the mechanical bursting element opener M is suitable for transmitting a force onto the degassing apparatus E and/or for exerting a pressure on the degassing apparatus E. The degassing apparatus E is opened by means of transmitting the force or exerting the pressure on the degassing apparatus E and substances that have escaped from the battery apparatus B can be dissipated by way of the degassing apparatus E. The degassing apparatus E can be a bursting element, a bursting disk, a bursting membrane or a bursting valve. The bursting element opener M can by way of example act upon the degassing apparatus E to such an extent that the degassing apparatus E is reversibly or irreversibly opened. The degassing apparatus E can be pressed or bent or broken by way of example by means of the bursting element opener M. The bursting element opener M can be in the shape of a prism. In addition, the bursting element opener M can be in the shape of a cone or a polyhedron. The bursting element opener M can be embodied by way of example from synthetic material or metal.

The gap between the battery apparatus B and the degassing apparatus E is produced by means of spacers that are referred to as ASH. The spacers ASH can have by way of example a cylindrical shape. The spacers ASH can be embodied by way of example from metal or synthetic material.

EE refers to an electrode element. The electrode element represents a component of the battery apparatus and comprises two electrodes and a separator that is arranged between the electrodes. The apparatus V is in particular suitable for producing a gap between the electrode element EE and the degassing apparatus E.

W refers to a winding axis of the electrode element EE. The substances that are to be dissipated from the electrode element EE can leave the electrode element EE in a direction parallel to the winding axis W. After the substances have left the electrode element EE, said substances flow towards the degassing apparatus E. Since damage to the battery apparatus B can lead to an increase in the volume of the electrode element EE, this can lead to an expansion of the electrode element EE in the direction of the degassing apparatus E. To a large extent, the apparatus V ensures as a spacer the possibility of dissipating the substances in an unhindered manner.

By virtue of the fact that the volume of the electrode element EE increases, the pressure that leads to the increase in the volume of the electrode element EE can be transmitted directly onto the degassing apparatus. The transmission of the pressure and the accompanying exertion of pressure by means of the bursting element opener M onto the degassing apparatus E causes the degassing apparatus E to open and in particular causes the apparatus O to open. The procedure of opening the degassing apparatus E and in particular the procedure of opening the opening apparatus O is used to dissipate the substances in an unhindered manner.

The battery system B in accordance with the disclosure in accordance with the third embodiment is by way of example suitable for use in a vehicle, in particular in a motor vehicle. In addition, the use of the battery system B in shipping, air travel and space travel or in energy storage devices, in wind power stations, in solar power stations or in emergency power generators is also feasible.

The invention claimed is:

1. A battery system, comprising:
at least one battery apparatus, having at least one safety apparatus configured to increase safety when using a degassing apparatus,
wherein the degassing apparatus is configured to degas battery apparatuses in a controlled manner, and
wherein the battery apparatus and the safety apparatus are surrounded by a housing and the degassing apparatus is inserted into a wall of the housing,
wherein the safety apparatus produces a gap between the battery apparatus and the degassing apparatus such that a space is kept free between the battery apparatus and the degassing apparatus so as to dissipate substances that escape from the battery apparatus in an area surrounding the battery system,
wherein the safety apparatus is configured to generate a force effect on the degassing apparatus in dependence upon a state of the battery apparatus, and the effect of the force causes the degassing apparatus to open, and
wherein the safety apparatus includes a mechanical bursting element opener configured to generate the force effect on the degassing apparatus via action of the mechanical bursting element opener on the degassing apparatus.

2. The battery system as claimed in claim 1, wherein the gap is between 0.001 m and 0.1 m.

3. The battery system as claimed in claim 2, wherein the gap is between 0.005 m and 0.015 m.

4. The battery system as claimed in claim 1, wherein:
the degassing apparatus is one of a bursting disk, a bursting membrane, a bursting valve, and an excess pressure valve;
the degassing apparatus is configured to be opened by one of an effect of a force and exerting a pressure; and
the degassing apparatus is configured to dissipate substances from the battery apparatus into the area surrounding the battery system.

5. The battery system as claimed in claim 4, wherein the pressure is between 2 bar and 10 bar.

6. The battery system as claimed in claim 1, wherein:
the at least one safety apparatus is configured to exert a pressure on the degassing apparatus in dependence upon a state of the battery apparatus; and
exerting the pressure opens the degassing apparatus.

7. The battery system as claimed in claim 6, wherein the at least one safety apparatus is configured to exert a pressure on the degassing apparatus in dependence upon at least one of a physical change of the battery apparatus and a pressure that prevails within the interior of the battery apparatus.

8. The battery system as claimed in claim 6, wherein the at least one safety apparatus is configured to exert a pressure of between 2 bar and 10 bar.

9. The battery system as claimed in claim 1, wherein the at least one safety apparatus defines at least one opening for substances that escape from the battery apparatus to pass therethrough.

10. The battery system as claimed in claim 1, wherein the at least one safety apparatus is electrically insulated.

11. The battery system as claimed in claim 1, wherein the battery system is suitable for use in a vehicle.

12. The battery system as claimed in claim 11, wherein the vehicle is a motor vehicle.

13. The battery system as claimed in claim 1, wherein the at least one safety apparatus is configured to generate a force effect on the degassing apparatus in dependence upon at least one of a physical change of the battery apparatus and a pressure that prevails within an interior of the battery apparatus.

14. The battery system as claimed in claim 1, wherein the action of the mechanical bursting element opener on the degassing apparatus causes the degassing apparatus to be reversibly opened.

15. The battery system as claimed in claim 1, wherein the action of the mechanical bursting element opener on the degassing apparatus causes the degassing apparatus to be irreversibly opened.

16. The battery system as claimed in claim 1, wherein the degassing apparatus includes an opening apparatus configured to permit dissipation of the substances therethrough upon the action of the mechanical bursting element opener.

17. The battery system as claimed in claim 16, wherein the opening apparatus is one or more of pressed, bent, and broken via the action of the mechanical bursting element opener thereon.

* * * * *